United States Patent
Yu et al.

(10) Patent No.: US 12,379,928 B2
(45) Date of Patent: Aug. 5, 2025

(54) METHOD AND APPARATUS FOR RECTIFYING WEAK MEMORY ORDERING PROBLEM

(71) Applicant: HUAWEI TECHNOLOGIES CO., LTD., Guangdong (CN)

(72) Inventors: Di Yu, Shenzhen (CN); Yandong Lv, Shanghai (CN); Rutao Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 18/320,039

(22) Filed: May 18, 2023

(65) Prior Publication Data

US 2023/0289187 A1    Sep. 14, 2023

Related U.S. Application Data (63) Continuation of application No. PCT/CN2021/123883, filed on Oct. 14, 2021.

(30) Foreign Application Priority Data

Nov. 19, 2020    (CN) .......................... 202011303988.0

(51) Int. Cl.
G06F 9/30    (2018.01)
G06F 8/41    (2018.01)
G06F 9/38    (2018.01)

(52) U.S. Cl.
CPC .......... *G06F 9/30192* (2013.01); *G06F 8/458* (2013.01); *G06F 9/3004* (2013.01);
(Continued)

(58) Field of Classification Search
CPC .... G06F 9/30192; G06F 8/458; G06F 9/3004; G06F 9/30087; G06F 9/38; G06F 9/3834; G06F 9/3856; G06F 8/41; G06F 9/3851
See application file for complete search history.

(56) References Cited

U.S. PATENT DOCUMENTS 6,209,073 B1 * 3/2001 Okpisz .................. G06F 9/3834
                                                    712/216
6,973,605 B1 * 12/2005 Templeton ............. G11C 29/44
                                                    714/731
(Continued)

FOREIGN PATENT DOCUMENTS

CN    101833440 A    9/2010

OTHER PUBLICATIONS

De Carvalho et al., "Improving Transactional Code Generation via Variable Annotation and Barrier Elision," Proceedings of 2020 IEEE International Parallel and Distributed Processing Symposium (IPDPS), May 18, 2020, pp. 1008-1017.
(Continued)

*Primary Examiner* — Corey S Faherty
(74) *Attorney, Agent, or Firm* — Fish & Richardson P.C.

(57) ABSTRACT

This application relates to the field of computer technologies, and discloses methods and apparatuses, for example, for rectifying a weak memory ordering problem. An example method includes: determining a read/write instruction set in to-be-repaired code; classifying instructions in the read/write instruction set to determine a target instruction; and inserting a memory barrier instruction between a previous read/write instruction of the target instruction and the target instruction. The read/write instruction set includes a read instruction and/or a write instruction in the to-be-repaired code, and an instruction in the read/write instruction set is used for memory access.

20 Claims, 5 Drawing Sheets

(52) U.S. Cl.
CPC ............ *G06F 9/30087* (2013.01); *G06F 9/38* (2013.01); *G06F 9/3834* (2013.01); *G06F 9/3856* (2023.08); *G06F 8/41* (2013.01); *G06F 9/3851* (2013.01)

(56) References Cited

U.S. PATENT DOCUMENTS

| | | | | |
|---|---|---|---|---|
| 7,447,876 | B2* | 11/2008 | Senter ................... | G06F 9/3854 712/213 |
| 7,941,627 | B2* | 5/2011 | Arimilli .............. | G06F 9/30087 711/152 |
| 10,417,056 | B2* | 9/2019 | Dice ........................ | G06F 9/526 |
| 11,507,379 | B2* | 11/2022 | Mukherjee ............ | G06F 9/3842 |
| 11,625,249 | B2* | 4/2023 | Kotra .................... | G06F 9/3001 712/214 |
| 2022/0413945 | A1* | 12/2022 | Ciolkosz ................. | G06F 9/526 |
| 2023/0315458 | A1* | 10/2023 | Srinath ................. | G06F 9/3851 712/209 |

OTHER PUBLICATIONS

Kuperstein et al., "Automatic Inference of Memory Fences," ACM SIGACT News, Jun. 2012, vol. 43, No. 2, 9 pages.

Yang, "A Static Analysis Method for Thread Modularization in Weakly Consistent Model," Security Model, Algorithm, and Programming, Jan. 31, 2018, 24 pages (with English translation).

Li [Online], "C++11:std:memory_order (C++11 Six Memory Sequences)," Aug. 28, 2020, retrieved from URL<https://so.csdn.net/so/search?q=c%2V%2B11%EF%BC%9Astd%3A3Amemory_orderandt=blogandu=weixin_40179091>, 7 pages (with English translation).

De Carvalho, "Optimizing Memory Transactions for Large-Scale Programs," Thesis for the degree of Doctor of Information Systems and Computer Engineering, University of Lisbon, Jan. 1, 2014, 187 pages.

Abdulla et al., "Automatic Fence Insertion in Integer Programs via Predicate Abstraction," Proceedings of Static Analysis: 19th International Symposium, SAS 2012, Sep. 11-13, 2012, pp. 164-180.

International Search Report and Written Opinion in International Appln. No. PCT/CN2021/123883, mailed on Jan. 14, 2022, 15 pages (with English translation).

Extended European Search Report in European Appln. No. 21893641.7, mailed on Mar. 25, 2024, 15 pages.

Zhuanlan.Zhihu.com [online], "Memory Order," Nov. 20, 2018, retrieved on May 8, 2025, retrieved from URL <https://zhuanlan.zhihu.com/p/45566448>, 10 pages (with English translation).

* cited by examiner

METHOD AND APPARATUS FOR RECTIFYING WEAK MEMORY ORDERING PROBLEM

CROSS-REFERENCE TO RELATED APPLICATIONS

This application is a continuation of International Patent Application No. PCT/CN2021/123883, filed on Oct. 14, 2021, which claims priority to Chinese Patent Application No. 202011303988.0, filed on Nov. 19, 2020. The disclosures of the aforementioned applications are hereby incorporated by reference in their entireties.

TECHNICAL FIELD

This application relates to the field of computer technologies, and in particular, to a method and an apparatus for rectifying a weak memory ordering problem.

BACKGROUND

When a multithreaded program developed based on a non-weak memory model is run in a computer device using a weak memory model (weak memory model), because instruction semantics supported by hardware in different memory models are different, threads running in parallel in the program may be out of order when executing a read/write instruction used for memory access, causing a weak memory ordering problem.

For example, when a multithreaded program developed based on a strong memory model (strong memory model) is run in a computer device using a weak memory model, a weak memory ordering problem may occur when threads running in parallel in the program execute a read/write instruction used for memory access. In this case, a logic error may occur in a function to be implemented by the program, and consequently, an output result of the program is inaccurate after the program is run.

Based on this, how to rectify a weak memory ordering problem of a multithreaded program is a technical problem that needs to be urgently resolved.

SUMMARY

This application provides a method and an apparatus for rectifying a weak memory ordering problem. The method can automatically rectify a weak memory ordering problem in a multithreaded program in a compiling phase.

To achieve the objective, this application provides the following technical solutions.

According to a first aspect, this application provides a method for rectifying a weak memory ordering problem. The method includes: determining a read/write instruction set in to-be-repaired code; classifying instructions in the read/write instruction set to determine a target instruction; and inserting a memory barrier instruction between a previous read/write instruction of the target instruction and the target instruction, where the read/write instruction set includes a read instruction and/or a write instruction in the to-be-repaired code, and an instruction in the read/write instruction set is used for memory access.

According to the method provided in this application, the to-be-repaired instructions may be classified, to determine the target instruction. Then, the memory barrier instruction is inserted before the target instruction, so that the target instruction can be executed in a sequence required by a program, to automatically repair a weak memory ordering problem of a multithreaded program. According to the method provided in this embodiment of this application, the weak memory ordering problem of the multithreaded program can be automatically repaired, so that efficiency of rectifying the weak memory ordering problem of the program is greatly improved.

In a possible design manner, the "classifying instructions in the read/write instruction set to determine a target instruction" specifically includes: determining a first-type instruction in the read/write instruction set; and determining the target instruction according to the first-type instruction, where an instruction in the first-type instruction is an instruction with weak memory ordering security; and the target instruction is an instruction in the read/write instruction set other than the first-type instruction.

In another possible design manner, the "determining the target instruction according to the first-type instruction" specifically includes: determining a target instruction set according to the first-type instruction; and determining the target instruction in the target instruction set according to an optimization policy, where the target instruction set includes all instructions in the read/write instruction set except the first-type instruction; and the optimization policy indicates a type of a read/write instruction having a to-be-repaired weak memory ordering problem.

In another possible design manner, the optimization policy includes at least one of the following policies: a first policy for determining a read/write instruction that is in the target instruction set and that belongs to a whitelist as the target instruction; or determining a read/write instruction that is in the target instruction set and that is other than a read/write instruction in a blacklist as the target instruction; a second policy for determining, as the target instruction, a read/write instruction serving only as a dependency in read/write instructions having a context dependency relationship in the target instruction set; a third policy for determining a read/write instruction in the target instruction set other than a read/write instruction related to a special-purpose register as the target instruction; and a fourth policy for determining a read/write instruction in the target instruction set other than a read/write instruction related to an input/output parameter as the target instruction.

In another possible design manner, the first-type instruction includes at least one of an instruction for reading/writing an inter-thread non-shared variable, or a read/write instruction with order-preserving semantics.

According to the several possible designs, a secure first-type instruction that does not have the weak memory ordering problem can be accurately identified, and the target instruction is determined by excluding the first-type instruction. According to the method, a read/write instruction that does not need to be repaired in the to-be-repaired code can be quickly excluded, so that insertion of unnecessary memory barrier instructions can be minimized, and running performance of the repaired multithreaded program is improved.

In addition, the insertion of the unnecessary memory barrier instructions can be further reduced by using the optimization policy, so that the running performance of the repaired multithreaded program can be further improved.

In another possible design manner, the "classifying instructions in the read/write instruction set to determine a target instruction" specifically includes: classifying the instructions in the read/write instruction set according to the foregoing optimization policy, to determine the target instruction, where the optimization policy indicates a type of a read/write instruction having a to-be-repaired weak memory ordering problem.

According to the possible implementation, in this application, the read/write instruction, in the read/write instruction set, for which the memory barrier instruction needs to be inserted may be determined by using the optimization policy. In this way, the insertion of the unnecessary memory barrier instructions can be reduced, and the running performance of the repaired multithreaded program is improved.

In another possible design manner, the method further includes: obtaining a fifth policy configured by a user; and adding the fifth policy to the optimization policy.

Herein, the fifth policy may be a user-customized policy. In this way, according to this possible design, this application allows rectifying the to-be-repaired code by using the user-defined policy, so that application flexibility of this application is improved.

In another possible design manner, before the "determining the target instruction", the method further includes: receiving indication information, where the indication information indicates a user to select the optimization policy from the to-be-selected optimization policies.

Herein, the to-be-selected optimization policy may be an optimization policy preset in a repair apparatus. In this way, in this possible design manner, the user may freely select, from the to-be-selected optimization policies, the optimization policy used for rectifying the to-be-repaired code, so that the application flexibility of this application is improved.

According to this possible implementation, the user can customize the optimization policy, so that the method in this application is flexibly implemented.

In another possible design manner, the "determining a read/write instruction set" specifically includes: identifying an instruction in a target function, to determine the read/write instruction set, where the target function is any function in the to-be-repaired code.

According to this possible design, in this application, the weak memory ordering problem in the to-be-repaired code may be identified and repaired by using a function as a unit. Therefore, the method in this application can be applied to repairing a weak memory ordering problem of a large-scale multithreaded program, to improve practicability of the method in this application.

In another possible design manner, the to-be-repaired code is an intermediate language obtained by compiling source code of a multithreaded program by a compiler.

In another possible design manner, the to-be-repaired code is assembly code obtained by compiling source code of a multithreaded program by a compiler.

According to the two possible designs, the method for repairing a weak memory ordering problem provided in this application may be synchronously performed with the source code compiling of the multithreaded program, so that the weak memory ordering problem of the multithreaded program is automatically repaired, to further improve the efficiency of rectifying the weak memory ordering problem of the multithreaded program.

According to a second aspect, this application provides an apparatus for rectifying a weak memory ordering problem.

In a possible design manner, the apparatus may be configured to perform the method provided in the first aspect. In this application, the apparatus may be divided into functional modules according to the method provided in the first aspect. For example, each functional module may be obtained through division based on a corresponding function, or two or more functions may be integrated into one processing module. For example, in this application, the apparatus may be divided into a processing unit, an insertion unit, and the like based on the functions. For descriptions of possible technical solutions performed by the foregoing functional modules obtained through division and beneficial effects, refer to the technical solutions provided in the first aspect or corresponding possible designs of the first aspect. Details are not described herein again.

In another possible design, the apparatus for rectifying a weak memory ordering problem includes a memory and one or more processors, and the memory is coupled to the processor. The memory is configured to store computer instructions, and the processor is configured to invoke the computer instructions, to perform the method provided in any one of the first aspect and the possible design manners of the first aspect.

According to a third aspect, this application provides a computer-readable storage medium, for example, a non-transient computer-readable storage medium. A computer program (or an instruction) is stored in the computer-readable storage medium. When the computer program (or the instruction) is run on an apparatus for repairing a weak memory ordering problem, the apparatus for repairing a weak memory ordering problem is enabled to perform the method provided in any possible implementation in the first aspect or the second aspect.

According to a fourth aspect, this application provides a computer program product. When the computer program product is run on an apparatus for rectifying a weak memory ordering problem, the method provided in any possible implementation in the first aspect is performed.

According to a fifth aspect, this application provides a chip system, including a processor. The processor is configured to invoke, from a memory, a computer program stored in the memory, and run the computer program, to perform the method provided in the implementations of the first aspect.

It may be understood that any one of the apparatus, the computer storage medium, the computer program product, the chip system, or the like provided above may be applied to a corresponding method provided above. Therefore, for beneficial effects that can be achieved by the apparatus, the computer storage medium, the computer program product, the chip system, or the like, refer to the beneficial effects of the corresponding method. Details are not described herein again.

In this application, names of the foregoing apparatus for rectifying a weak memory ordering problem do not constitute any limitation to devices or functional modules. During actual implementation, these devices or functional modules may have other names. Each device or functional module falls within the scope defined by the claims and their equivalent technologies in this application, provided that a function of the device or functional module is similar to that described in this application.

These aspects or other aspects in this application are more concise and comprehensible in the following descriptions.

DESCRIPTION OF EMBODIMENTS

To better understand embodiments of this application, the following describes some terms or technologies used in embodiments of this application.

(1) Compiler

A compiler is usually used for translating "one language" into "another language". For example, program source code developed by a developer, as required, by using a high-level computer language (for example, a C language or a C++ language) is translated into machine language code (for example, binary code) that can be identified and run by a machine.

Generally, an assembly function may be integrated into the compiler. In this way, the compiler may first compile program source code processed by a preprocessor (preprocessor) into assembly code. The assembly code is assembly language code. Then, the assembly code is further compiled into target code by using the assembly function. The target code is language code that can be identified by the machine, for example, binary code. In this way, the target code combines independently assembled machine language programs in the target code by using a linker (linker), to obtain machine-executable program code.

Optionally, to improve a compiling effect, before compiling the program source code processed by the preprocessor into the assembly code, the compiler first performs compiling to obtain an intermediate language. The intermediate language is generated after the compiler parses the preprocessed program source code, and the intermediate language is used for optimizing compiling of the compiler to obtain the target code.

Figure 1:
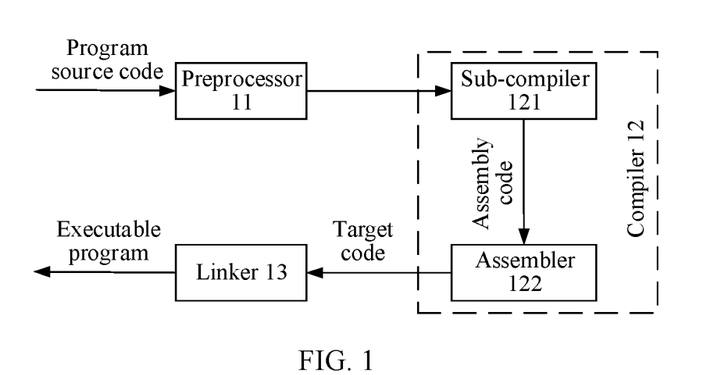
FIG. 1 is a schematic diagram of a process of compiling program source code into machine-executable program code in the conventional technology.

For example, FIG. 1 is a schematic diagram of a process of compiling program source code into machine-executable program code.

As shown in FIG. 1, after being processed by a preprocessor 11, program source code is input into a compiler 12. A sub-compiler 121 of the compiler 12 may compile the preprocessed program source code into assembly code and output the assembly code. Then, an assembler 122 performs assembling and compiling on the assembly code output by the sub-compiler 121, to obtain target code. The target code is code that can be identified by a machine. Finally, after the target code is processed by a linker 13, an executable program that can be run by the machine may be obtained.

After the sub-compiler 121 parses the preprocessed program source code, an intermediate language may be generated. The sub-compiler 121 may further compile the intermediate language, to obtain the assembly code shown in FIG. 1.

(2) Multithreaded Program

An instance of a running program is usually referred to as a process. One process may include at least one thread, and the thread is a single-order control flow in the process. Usually, a plurality of threads may be concurrent in one process, and the plurality of threads may run in parallel by using a plurality of processing cores in a computer device, to perform different tasks. Certainly, there may be only one thread in one process. This is not limited herein.

Therefore, a multithreaded program is a program, during running, in which a process of the program includes a plurality of threads.

(3) Other Terms

In embodiments of this application, the word "example" or "for example" is used for representing giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In this application, the term "at least one" means one or more, and in this application, the term "a plurality of" means two or more. For example, a plurality of second packets mean two or more second packets. Terms "system" and "network" may be used interchangeably in this specification.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be understood that determining B based on A does not mean that B is determined based on only A, and B may alternatively be determined based on A and/or other information.

It should be further understood that the term "include" (or referred to as "includes", "including", "comprises", and/or "comprising"), when being used in this specification, specifies the presence of stated features, integers, steps, operations, elements, and/or components, but do not preclude presence or addition of one or more other features, integers, steps, operations, elements, components, and/or groups thereof.

It should be understood that "one embodiment", "an embodiment", and "a possible implementation" mentioned in the entire specification mean that particular features, structures, or characteristics related to an embodiment or the implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

It should be understood that threads that run in parallel in a multithreaded program are control flows independent of each other, but instructions that are in different threads and that are used for memory access (for brief description, "memory access" is abbreviated as "memory access" in embodiments of this application) may have a logical relationship. Herein, the instructions used for memory access usually include a read instruction and/or a write instruction.

For example, in a multithreaded program developed based on a non-weak memory model, a write instruction 1 used for memory access in a first thread is used for writing (storing) a value 0 in a register 1 into a memory. A read instruction 2 used for memory access in a second thread is used for reading (loading) a value 0 from the memory to a register 2. Therefore, there is a logical sequence relationship between the write instruction 1 and the read instruction 2. To be specific, after the write instruction 1 writes the value 0 in the register 1 into the memory, the read instruction 2 can read the value 0 from the memory to the register.

When the first thread and the second thread of the multithreaded program run in parallel by using two processing cores of a computer device that uses a weak memory model, if the write instruction 1 is executed earlier than a read instruction or a write instruction that is in the first thread and that is located before the write instruction 1, the write instruction 1 may be executed later than the read instruction 2 in the second thread. When the write instruction 1 is executed later than the read instruction 2 in the second thread, when the read instruction 2 in the second thread is executed, the memory is empty, that is, the value 0 in the register 1 is not written into the memory. In this way, a logical error occurs in tasks performed by the first thread and the second thread. This may cause a program crash, an inaccurate output result, or the like. As a result, the write instruction 1 in the first thread generates a weak memory ordering problem.

Generally, when a thread of a program is running, weak memory ordering may occur in the following cases: read-read (loadload), write-write (storestore), read-write (loadstore), and write-read (storeload). In other words, an execution sequence of two read instructions is reversed, an execution sequence of two write instructions is reversed, an execution sequence of a read instruction and a write instruction is reversed, and an execution sequence of a write instruction and a read instruction is reversed. Herein, that the instruction execution sequence is reversed means that the instruction execution sequence is opposite to an execution sequence required by the program.

For the foregoing weak memory ordering problem, a memory barrier instruction may be generally inserted between memory access instructions, to ensure that the two memory access instructions can be executed in a sequence required by the program.

For example, in a program 1 developed based on a non-weak memory model, a normal execution sequence of an instruction 1 used for memory access and an instruction 2 used for memory access is "the instruction 1 and the instruction 2". When the program 1 is run in a computer device using a weak memory model, a weak memory ordering problem may occur between the instruction 1 and the instruction 2. In this case, a memory barrier instruction may be inserted between the instruction 1 and the instruction 2. In this way, it can be ensured that when the program 1 is run in the computer device using the weak memory model, the instruction 1 and the instruction 2 may be executed in a sequence of "the instruction 1 and the instruction 2".

However, in a conventional method, a location at which a memory barrier instruction needs to be inserted in a program is generally determined by a developer based on experience. When a size of the program is large, efficiency of the method is extremely low.

Based on this, embodiments of this application provide a method for rectifying a weak memory ordering problem. The method is applied to an apparatus for rectifying a weak memory ordering problem (for ease of description, in the following descriptions of embodiments of this application, the "apparatus for rectifying a weak memory ordering problem" is referred to as a "repair apparatus"). In the method, to-be-repaired code is identified, to determine a read/write instruction set in the to-be-repaired code, where the read/write instruction set includes a read/write instruction used for memory access. Then, the repair apparatus classifies, based on the determined read/write instruction set, read/write instructions in the read/write instruction set, to determine a target instruction for which a memory barrier instruction needs to be inserted. Finally, the memory barrier instruction is inserted before the target instruction, to automatically rectify a weak memory ordering problem of the to-be-repaired code, so as to greatly improve efficiency of rectifying the weak memory ordering problem of the to-be-repaired code.

The to-be-repaired code may be an intermediate language obtained by compiling multithreaded program source code by using a compiler, or may be assembly code obtained by compiling by using the compiler. This is not specifically limited in embodiments of this application.

The multithreaded program source code may be program source code developed by using a high-level computer language such as C, C++, or Fortran. This is not specifically limited in embodiments of this application.

An embodiment of this application further provides a repair apparatus. The repair apparatus may be used in any computing device having a computing processing capability, and the computing device may be a general-purpose computer, a server, or the like. This is not specifically limited in embodiments of this application.

Figure 2:
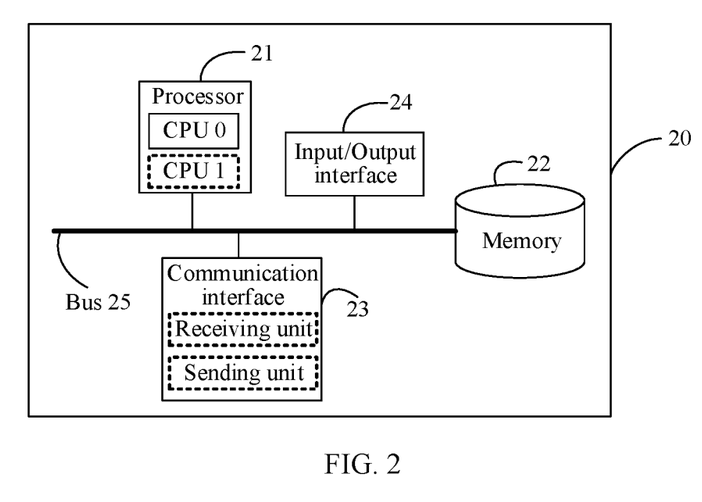
FIG. 2 is a schematic diagram of a hardware structure of a computing device according to an embodiment of this application.

FIG. 2 is a schematic diagram of a hardware structure of a computing device 20 according to an embodiment of this application. The foregoing apparatus for rectifying a weak memory ordering problem may be used in the computing device 20. As shown in FIG. 2, the computing device 20 includes a processor 21, a memory 22, a communication interface 23, an input/output interface 24, and a bus 25. The processor 21, the memory 22, the communication interface 23, and the input/output interface 24 may be connected to each other by using the bus 25.

The processor 21 is a control center of the computing device 20, and may be a general-purpose central processing unit (CPU), another general-purpose processor, or the like. The general-purpose processor may be a microprocessor, any conventional processor, or the like.

In an example, the processor 21 may include one or more CPUs, for example, a CPU 0 and a CPU 1 that are shown in FIG. 2. The CPU 0 and the CPU 1 may run two threads of a multithreaded program in parallel.

The memory 22 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In a possible implementation, the memory 22 may be independent of the processor 21. The memory 22 may be connected to the processor 21 by using the bus 25, and is configured to store data, instructions, or program code. When invoking and executing the instructions or the program code stored in the memory 22, the processor 21 can implement the method for rectifying an out-of-order access problem provided in embodiments of this application.

In another possible implementation, the memory 22 may alternatively be integrated with the processor 21.

The communication interface 23 is configured to connect the computer device 20 to another device (for example, a network node in a public cloud) by using a communication network. The communication network may be an Ethernet, a radio access network (RAN), a wireless local area network (WLAN), or the like. The communication interface 23 may include a receiving unit configured to receive data and a sending unit configured to send data.

The input/output interface 24 is configured to implement human-machine interaction between a user and the computing device 20. The input/output interface 24 may be a component such as a mouse, a keyboard, or a touchscreen, which is certainly not limited thereto.

For example, the user may submit a blacklist, a whitelist, or the like to the computing device based on the input/output interface.

The bus 25 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

It should be noted that the structure shown in FIG. 2 does not constitute a limitation on the computing device 20. In addition to the components shown in FIG. 2, the computing device 20 may include more or fewer components than those shown in the figure, combine some components, or have different component arrangements.

With reference to the accompanying drawings, the following describes the method for rectifying a weak memory ordering problem provided in embodiments of this application.

Figure 3:
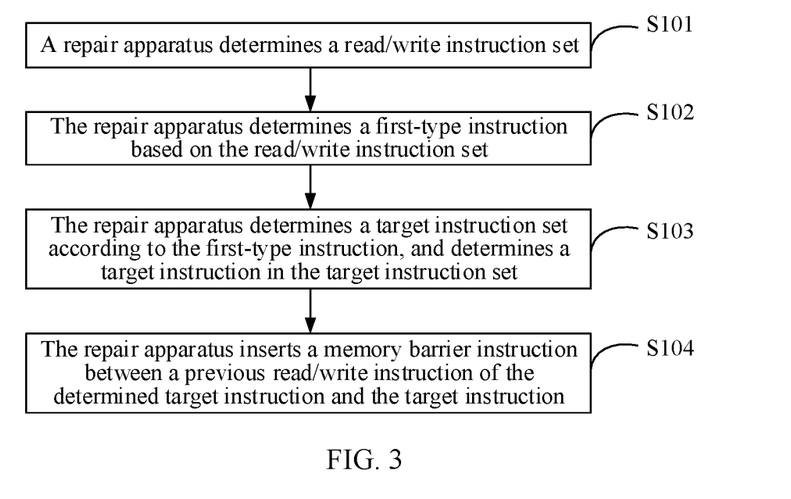
FIG. 3 is a schematic flowchart of a method for rectifying a weak memory ordering problem according to an embodiment of this application.

FIG. 3 is a schematic flowchart of a method for rectifying a weak memory ordering problem according to an embodiment of this application. The method may be applied to the repair apparatus shown in FIG. 2. The method may include the following steps.

S101: The repair apparatus determines a read/write instruction set.

Specifically, the repair apparatus may determine the read/write instruction set in to-be-repaired code, where the read/write instruction set includes a read instruction and/or a write instruction in the to-be-repaired code, and an instruction in the read/write instruction set is used for memory access.

For example, a read instruction "ldr x1, [x0]" indicates to read a value from a memory address to which a general-purpose register x0 points, and write the value into a general-purpose register x1. For another example, a write instruction "str x1, [x0]" indicates to write a value in the general-purpose register x1 into the memory address to which the general-purpose register x0 points.

For brief description, in the following descriptions of embodiments of this application, the "read instruction and/or the write instruction" is referred to as a "read/write instruction" for short.

The to-be-repaired code is an intermediate language obtained by compiling source code of a multithreaded program by a compiler. Alternatively, the to-be-repaired code may be assembly code obtained by compiling source code of a multithreaded program by using a compiler. This is not specifically limited in embodiments of this application. Herein, for related descriptions of the compiler and the intermediate language, refer to the foregoing descriptions. Details are not described herein again.

Optionally, the to-be-repaired code may alternatively be an intermediate language obtained by compiling a to-be-repaired module in source code of a multithreaded program by using a compiler. Alternatively, the to-be-repaired code may be assembly code obtained by compiling a to-be-repaired module in source code of a multithreaded program by using a compiler. This is not specifically limited in embodiments of this application.

The to-be-repaired module may be one of a plurality of modules obtained after a developer divides the source code of the multithreaded program. Alternatively, the to-be-repaired module may be one of a plurality of modules obtained after a preprocessor or the compiler divides the source code of the multithreaded program. This is not limited in embodiments of this application.

The source code of the multithreaded program may be divided based on functions or purposes that can be implemented by the code, and certainly is not limited thereto.

The plurality of modules obtained after the source code of the multithreaded program is divided include a security module and a non-security module. The security module is a read/write instruction obtained after source code in the module is compiled, and no weak memory ordering problem is caused. The non-security module is a read/write instruction obtained after source code in the module is compiled, and a weak memory ordering problem is caused. Therefore, the non-security module is the foregoing to-be-repaired module.

Optionally, it may be determined through a large quantity of running tests that the security module does not generate the weak memory ordering problem. This is not specifically limited.

Specifically, the repair apparatus may determine the read/write instruction in the to-be-repaired code by identifying an instruction in the to-be-repaired code, to obtain the read/write instruction set corresponding to the to-be-repaired code.

In a possible implementation, the repair apparatus may identify an instruction in a target function by using a function in the to-be-repaired code as a unit, to determine a read/write instruction in the target function, so as to obtain a read/write instruction set corresponding to the target function. The target function is any function in the to-be-repaired code. It should be understood that the to-be-repaired code includes at least one function.

Specifically, the repair apparatus may traverse each instruction in the target function, and identify each instruction in the target function, to determine the read/write instruction in the target function, so as to obtain the read/write instruction set corresponding to the target function.

In this way, after identifying an instruction in each function in the to-be-repaired code, the repair apparatus may determine a read/write instruction set corresponding to each function. A set of the read/write instruction sets corresponding to all the functions includes all read/write instructions in the to-be-repaired code.

It can be learned that when the read/write instruction set is determined in this manner, each function in the to-be-repaired code may correspond to one read/write instruction set, that is, the functions in the to-be-repaired code correspond one-to-one to the determined read/write instruction sets. Alternatively, the to-be-repaired code may correspond to one read/write instruction set. In this case, the read/write instruction set may be obtained after the repair apparatus aggregates the read/write instruction sets determined based on the functions. This is not specifically limited in embodiments of this application.

In another possible implementation, the repair apparatus may traverse instructions in the to-be-repaired code, and identify the instructions in the to-be-repaired code, to determine the read/write instruction in the to-be-repaired code, so as to obtain the read/write instruction set corresponding to the to-be-repaired code.

It may be learned that when the read/write instruction set is determined in this manner, the to-be-repaired code corresponds to one read/write instruction set.

S102: The repair apparatus determines a first-type instruction based on the read/write instruction set.

The repair apparatus may determine the first-type instruction in the read/write instruction set based on the determined read/write instruction set. Herein, an instruction in the first-type instruction does not cause a weak memory ordering problem, that is, the first-type instruction is an instruction with weak memory ordering security.

The instruction in the first-type instruction may be an instruction that does not generate the weak memory ordering problem, or may be an instruction that does not generate the weak memory ordering problem in a preset context. This is not limited herein.

Optionally, the first-type instruction may include at least one of an instruction for reading/writing an inter-thread non-shared variable, or a read/write instruction with order-preserving semantics.

The inter-thread non-shared variable is a special-purpose variable in a thread (for example, a first thread), and the variable is invoked only by the first thread. In this way, for an instruction that read/write the variable, the weak memory ordering problem is usually not generated.

For example, the instruction for reading/writing the inter-thread non-shared variable may include at least one of a local variable reading/writing instruction or a thread local reading/writing instruction.

For the read/write instruction with order-preserving semantics, the semantics of the read/write instruction prevent the weak memory ordering problem when the instruction is executed.

S103: The repair apparatus determines a target instruction set according to the first-type instruction, and determines a target instruction in the target instruction set.

Instructions in the target instruction set are all instructions in the read/write instruction set except the first-type instruction. In this way, the repair apparatus may determine the target instruction set in the read/write instruction set based on the determined first-type instruction.

Further, the repair apparatus may determine the target instruction in the target instruction set.

In a possible implementation, the repair apparatus may determine all instructions in the target instruction set as target instructions. In other words, the repair apparatus repairs all instructions in the target instruction set.

In another possible implementation, the repair apparatus may determine the target instruction in the target instruction set based on at least one of the following optimization policies. The optimization policy indicates a type of a read/write instruction having a to-be-repaired weak memory ordering problem.

The optimization policy may be preset in the repair apparatus; or the repair apparatus may obtain, when starting to repair the to-be-repaired code, the optimization policy configured by a user. This is not limited herein.

The optimization policy may include a first policy to a fourth policy described below. It may be understood that the first policy to the fourth policy are merely examples for description, and embodiments of this application are not limited thereto.

In one case, when the foregoing optimization policy is an optimization policy preconfigured by a user, the user may submit the optimization policy to the repair apparatus through an input/output interface of a computing device by using a graphical interaction interface, inserting a command line, setting a configuration file, or the like. In response, the repair apparatus may obtain the optimization policy configured by the user, and when rectifying the to-be-repaired code, determine the target instruction according to the obtained optimization policy.

For example, the user submits the optimization policy to the repair apparatus through the input/output interface of the computing device by setting the configuration file. Generally, the user may place the preconfigured optimization policy file in a root directory of the repair apparatus, and modify a suffix format of the file, to set the configuration file of the optimization policy in the repair apparatus. In this way, when performing the method provided in this embodiment of this application, the repair apparatus may determine the target instruction in the target instruction set according to the optimization policy indicated by the configuration file, and repair the target instruction.

Certainly, the foregoing optimization policy may further include a fifth policy customized by the user based on a requirement of the user. This is not limited in embodiments of this application.

In this case, the repair apparatus may pre-obtain the fifth policy customized by the user, and add the fifth policy to the foregoing optimization policy. In this way, when rectifying the to-be-repaired code, the repair apparatus may determine the target instruction according to an optimization policy including the fifth policy. Herein, for a process in which the repair apparatus pre-obtains the fifth policy customized by the user, refer to the foregoing descriptions of obtaining, by the repair apparatus, the optimization policy preconfigured by the user. Details are not described herein again.

In another case, the foregoing optimization policy is preset in the repair apparatus. In this way, the repair apparatus may determine, according to the preset optimization policy, the target instruction in a process of rectifying the to-be-repaired code. Certainly, the repair apparatus may alternatively use the preset optimization policy as a to-be-selected optimization policy. In this way, when starting to repair the to-be-repaired code, the repair apparatus may receive indication information entered by the user, and determine the target instruction according to the optimization policy indicated by the indication information. Herein, the indication information indicates the optimization policy selected by the user from the to-be-selected optimization policies.

It should be understood that the optimization policy preset in the repair apparatus may include the fifth policy that is customized by the user and that is pre-obtained by the repair apparatus. Certainly, when rectifying the to-be-repaired code, the repair apparatus may alternatively obtain the fifth policy customized by the user. This is not limited herein. The following uses an example in which when rectifying the to-be-repaired code, the repair apparatus obtains the fifth policy customized by the user for description.

Figure 4A:
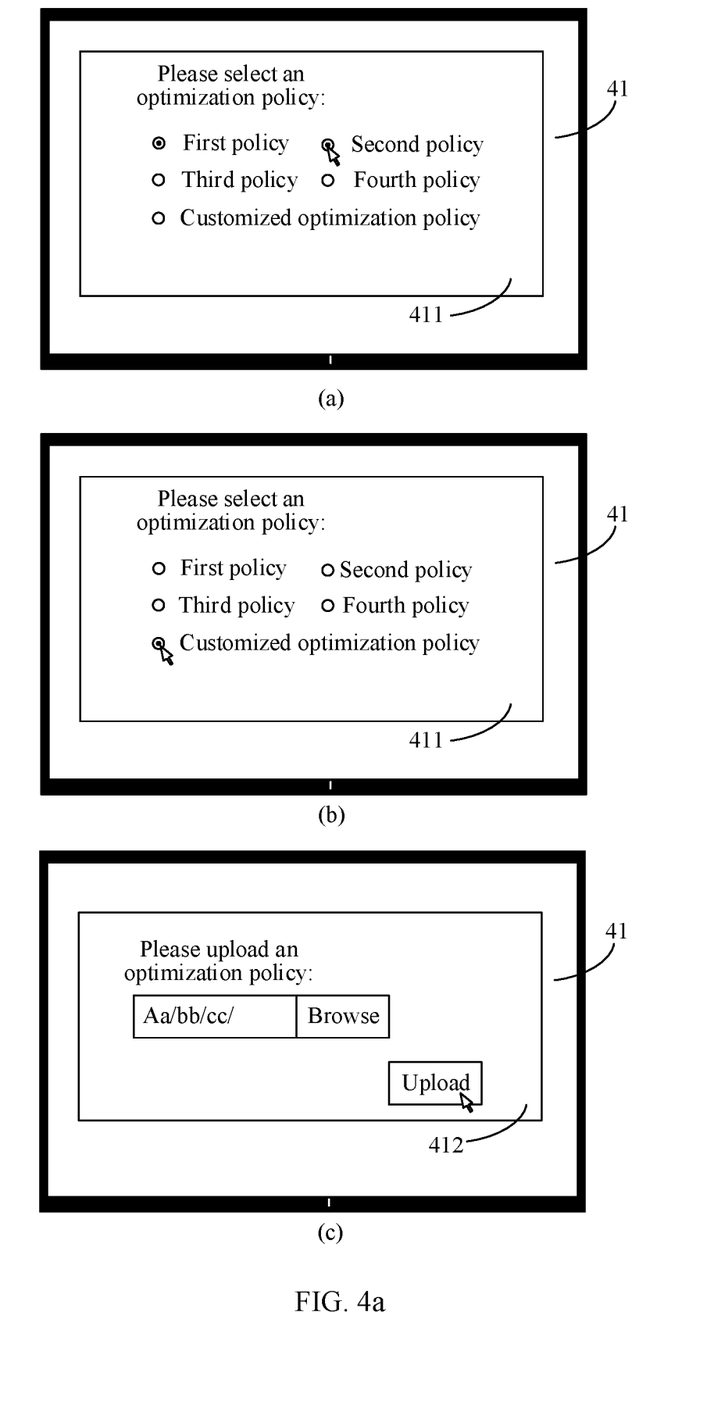
FIG. 4a is a schematic diagram in which a repair apparatus obtains, based on a graphical interaction interface, an optimization policy selected by a user from to-be-selected optimization policies according to an embodiment of this application.

For example, FIG. 4a is a schematic diagram in which the repair apparatus obtains, based on the graphical interaction interface, an optimization policy selected by a user from the to-be-selected optimization policies. As shown in (a) in FIG. 4a, when preparing to repair the to-be-repaired code or when starting to compile the source code of the multithreaded program, the repair apparatus may display options: First policy, Second policy, Third policy, Fourth policy, Customized optimization policy, and the like by using a dialog box 411 on a display interface 41 (for example, a display) of the computing device, so as to query the user about an optimization policy that needs to be used for repairing the to-be-repaired code. The first policy, the second policy, the third policy, and the fourth policy are optimization policies preset in the repair apparatus. The customized optimization policy is an optimization policy that needs to be submitted by the user immediately.

As shown in (a) in FIG. 4a, when the user selects options "First policy" and "Second policy" by controlling a mouse (or a keyboard), indication information used for indicating the "first policy" and the "second policy" is sent to the repair apparatus. In this way, the repair apparatus can determine, based on the indication information, that optimization policies selected by the user are the "first policy" and the "second policy". In this way, the repair apparatus may determine, according to the optimization policies selected by the user, the target instruction in the target instruction set, and repair the target instruction.

As shown in (b) in FIG. 4a, when the user selects the option "Customized optimization policy" by controlling a mouse (or a keyboard), the user may upload, by controlling the mouse (or the keyboard), a policy pre-customized by the user in a dialog box 412 shown in (c) in FIG. 4a. For example, the user may first operates the mouse (or the keyboard) to search for a storage directory "Aa/bb/cc/" of the customized policy by clicking a "Browse" icon. Then, the user can click an "Upload" icon by using the mouse or keyboard to upload the user-customized policy. In response, the repair apparatus receives the customized policy uploaded by the user. In this way, the repair apparatus may determine the target instruction in the target instruction set according to the customized policy, and repair the target instruction.

It can be learned that the user is allowed to customize the policy, and the user is allowed to freely select the optimization policy from the to-be-selected optimization policies, so that application of the method provided in this embodiment of this application is more flexible.

It should be understood that the repair apparatus obtains, before the technical solutions described in embodiments of this application are performed, the optimization policy configured by the user. In this way, the repair apparatus can repair, by using the configured optimization policy, a type, of a read/write instruction, indicated by the optimization policy in a process of performing the method provided in this embodiment of this application.

The following describes the first policy to the fourth policy by using examples.

First policy: The repair apparatus may determine a read/write instruction that is in the target instruction set and that belongs to a whitelist as the target instruction; or the repair apparatus may determine a read/write instruction that is in the target instruction set and that is other than a read/write instruction in a blacklist as the target instruction;

The whitelist and the blacklist may be a blacklist and a whitelist of functions in the to-be-repaired code, or may be a blacklist and a whitelist of different functional modules in the to-be-repaired code. This is not limited herein.

The following is described by using an example in which the foregoing whitelist and blacklist are the blacklist and the whitelist of the functions in the to-be-repaired code.

The blacklist of the functions usually includes functions such as a safe function and/or a hotspot function in the to-be-repaired code.

Herein, the safe function may generally be a function that does not cause a weak memory ordering problem after an executable program obtained through common compiling of the safe function is run, or the safe function may be a function that is in the source code and that does not include a shared variable, or the like. This is not limited. Because the safe function usually does not cause the weak memory ordering problem, the repair apparatus does not need to repair the weak memory ordering problem of the safe function.

A hot function is usually a function that is frequently invoked by a program. For example, if a quantity of times that a function A is invoked by the program is greater than or equal to a preset threshold, the function A is a hotspot function. A weak memory ordering problem of an instruction is rectified by inserting a memory barrier instruction before the instruction. Therefore, for the hotspot function, because the hotspot function is frequently invoked, when a memory barrier instruction is inserted into the hotspot function, running performance of the program is reduced. Therefore, for the hotspot function, the repair apparatus does not repair a weak memory ordering problem of the hotspot function.

Certainly, the hotspot function in the blacklist of the functions may alternatively be determined, as a hotspot function having no weak memory ordering problem, in advance in the foregoing manner of determining the safe function.

The whitelist of the functions usually includes a function other than the hotspot function and/or the safe function in the to-be-repaired code. For this type of function, the repair apparatus may repair a weak memory ordering problem.

It should be understood that the repair apparatus may preset the foregoing function blacklist and/or function whitelist, or the repair apparatus may obtain the function blacklist and/or the function whitelist that are/is preconfigured by the user. This is not limited herein.

When the function blacklist and/or the function whitelist are/is preconfigured by the user, the user may submit the preconfigured function blacklist and/or function whitelist to the repair apparatus through the input/output interface of the computing device by using a graphical interaction interface, inserting a command line, setting a configuration file, or the like. In response, the repair apparatus may obtain the function blacklist and/or the function whitelist configured by the user. Herein, for a process in which the repair apparatus obtains the function blacklist and/or the function whitelist configured by the user, refer to descriptions of the process in which the repair apparatus obtains the user-customized optimization policy. Details are not described again.

Second policy: The repair apparatus may determine, as the target instruction, a read/write instruction serving only as a dependency in read/write instructions having a context dependency relationship in the target instruction set;

Optionally, the repair apparatus may analyze the instruction in the target instruction set, and determine, based on the context dependency relationship of the read/write instruction in the target instruction set, the read/write instruction serving only as the dependency. Herein, the read/write instruction serving only as the dependency is an instruction that does not depend on another read/write instruction in the target instruction set.

For example, if the target instruction set includes the following instructions:

an instruction 1: ldr x0, [s1]; and
an instruction 2: str x0, [s2].

The instruction 1 "ldr x0, [s1]" indicates that a register x0 is read from a memory address indicated by a register s1. The instruction 2 "str x0, [s2]" indicates that a value in the register x0 is written into a memory address indicated by a register s2. It can be learned that when the instruction 1 is not executed, to be specific, when the value in the register x0 is not read from the memory address indicated by the register s1, the instruction 2 cannot be executed to write the value in the register x0 into the memory address indicated by the register s2. In other words, the instruction 1 and the instruction 2 are instructions having a dependency relationship, and the instruction 1 is a dependency of the instruction 2. That is, execution of the instruction 2 depends on execution of the instruction 1. In this case, when execution of the instruction 1 does not depend on another read/write instruction in the target instruction set, the repair apparatus may determine that the instruction 1 serves only as a dependent read/write instruction.

For read and write instructions that have a context dependency and depend on execution of another instruction, weak memory ordering problems usually do not occur. Therefore, the repair apparatus may generally not repair this type of instruction.

Third policy: The repair apparatus may determine a read/write instruction in the target instruction set other than a read/write instruction related to a special-purpose register as the target instruction.

The special-purpose register is usually a register that is used only for a specific instruction or scenario. For example, the special-purpose register may be a floating-point register. Herein, the floating-point register is a register used for storing floating-point numbers.

For example, the special-purpose register is a floating-point register. The repair apparatus may determine, by identifying a name of a register in the read/write instruction, whether the register is a floating-point register. When the register in the read/write instruction is a floating-point register, the repair apparatus may determine that the read/write instruction is a read/write instruction for performing an operation on the floating-point register.

Because the special-purpose register is generally not used for reading or writing a global control variable, a read/write instruction for operating the special-purpose register generally does not cause a weak memory ordering problem. Therefore, the repair apparatus may generally not repair the read/write instruction for performing an operation on the special-purpose register.

Fourth policy: The repair apparatus may determine a read/write instruction in the target instruction set other than a read/write instruction related to an input/output parameter as the target instruction.

The input/output parameter includes a parameter that needs to be input when a function is invoked, and a return value of the function.

For example, when the general-purpose register x0 is a register configured to store a return value of a function, it is assumed that instructions in the target instruction set are as follows:

B malloc; and
str x11, [x0], where

"B" indicates that an instruction type is an instruction that invokes the function, and "malloc" is a name of a function used for applying for a memory. The instruction "B malloc" indicates that the function malloc is invoked. After the "malloc" function is executed, a memory address returned by "malloc" is written into the general-purpose register x0. In this case, the instruction "Str x11, [x0]" indicates to write a value in the register "x11" into a memory address indicated by the general-purpose register x0, where the memory address is the memory address returned by "malloc". In this case, the instruction "str x11, [x0]" is a read/write instruction related to the input/output parameter.

Generally, in a similar scenario, for a read/write instruction related to an input/output parameter, a weak memory ordering problem does not occur. Therefore, the repair apparatus may not repair the read/write instruction.

It should be noted that, when determining the target instruction according to the fourth policy, the repair apparatus may further determine the target instruction based on a context logical relationship of the instructions in the target instruction set. Details are not described herein.

It should be noted that, when the optimization policy used by the repair apparatus is any policy combination of the first policy to the fourth policy, the repair apparatus may preset priorities of the plurality of policies in the policy combination. In this way, when a same read/write instruction generates opposite results according to two different policies, the repair apparatus may process the read/write instruction based on the priorities by using a policy with a higher priority. The priority indicates a priority level of a policy, and a policy with a higher priority level is preferentially used than a policy with a lower priority level.

For example, when the policy combination is the second policy and the third policy, if the instruction 1 serves only as a dependency, the repair apparatus needs to repair the instruction 1 as indicated by the second policy. In addition, if the instruction 1 is an instruction for reading or writing a floating-point register, the repair apparatus does not need to repair the instruction 1 as indicated by the third policy. In this case, different policies in the policy combination produce opposite results on the same instruction. In this case, if the priority of the second policy in the policy combination is higher than that of the third policy, the repair apparatus determines, according to the second policy, the instruction 1 as the target instruction, and repairs the instruction 1.

S104: The repair apparatus inserts a memory barrier instruction between a previous read/write instruction of the determined target instruction and the target instruction.

After determining the target instruction, the repair apparatus inserts the memory barrier instruction between the previous read/write instruction of the determined target instruction and the target instruction, so that the weak memory ordering problem of the instruction in the to-be-repaired code is repaired.

The memory barrier instruction indicates that the target instruction is executed after execution of the read/write instruction before the memory barrier instruction is completed.

For example, if the target instruction is an instruction 1, the previous read/write instruction of the target instruction is an instruction 2. Then, when the repair apparatus inserts the memory barrier instruction between the instruction 1 and the instruction 2, the memory barrier instruction indicates the instruction 1 to be executed after the instruction 2.

In this case, this embodiment of this application provides a method for rectifying a weak memory ordering problem. In the method, in a process of compiling source code of a multithreaded program, to-be-repaired instructions are classified, to determine a target instruction set. Then, a target instruction for which a memory barrier instruction needs to be inserted into is further determined in the target instruction set by using an optimization policy, so that the target instruction can be executed in a sequence required by the program. According to the method, the repair apparatus can automatically repair a weak memory ordering problem of the multithreaded program.

Figure 4B:
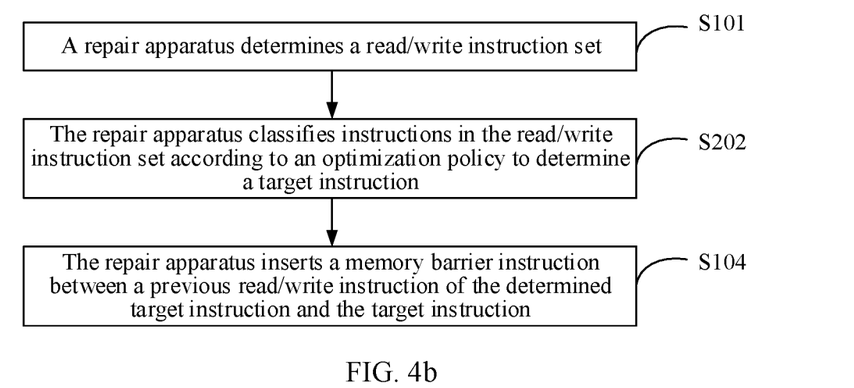
FIG. 4b is a schematic flowchart of another method for rectifying a weak memory ordering problem according to an embodiment of this application.

Optionally, refer to FIG. 4b. In another method for rectifying a weak memory ordering problem according to an embodiment of this application, S102 and S103 may be replaced with the following step S202.

S202: The repair apparatus classifies the instructions in the read/write instruction set according to an optimization policy to determine the target instruction.

The read/write instruction set is the read/write instruction set determined by the repair apparatus in S101.

The optimization policy indicates a type of a read/write instruction having a to-be-repaired weak memory ordering problem. For descriptions of the optimization policy, refer to the foregoing description about the optimization policy. Details are not described herein again.

Specifically, the repair apparatus may divide, according to the foregoing optimization policy, the read/write instructions in the read/write instruction set determined in step S101 into a read/write instruction for which a memory barrier instruction needs to be inserted and a read/write instruction for which no memory barrier instruction needs to be inserted. Then, the repair apparatus determines the read/write instruction for which the memory barrier instruction needs to be inserted as the target instruction.

In this way, in a process of compiling the source code of the multithreaded program, according to the method for rectifying a weak memory ordering problem provided in this embodiment of this application, the to-be-repaired instructions may be directly classified by using the optimization policy, so as to determine the target instruction for which the memory barrier instruction needs to be inserted. In this way, it can be ensured that the target instruction is executed in the sequence required by the program. According to the method, the repair apparatus can automatically repair the weak memory ordering problem of the multithreaded program.

To better understand the method provided in this embodiment of this application, the following uses an example in which the method for rectifying a weak memory ordering problem provided in embodiments of this application is used in a GNU compiler collection (GCC) to repair a weak memory ordering problem of a multithreaded program.

The GCC supports compiling of program source code developed by using a high-level computer language such as C, C++, or Fortran. A working process of compiling the program source code by the GCC includes: pre-processing (pre-processing), compiling (compiling), assembling (assembling), and linking (linking). The method for rectifying a weak memory ordering problem provided in this embodiment of this application may be applied to a compiling phase.

In a compiling phase of the GCC, after the preprocessed multithreaded program source code is compiled, an intermediate language (for example, a register transformation language (RTL) expression) of the compiler may be obtained. Then, the GCC may output the optimized intermediate language as assembly code through a final module.

Generally, the final module uses a function as a unit and outputs the intermediate language as the assembly code. Specifically, the final module outputs the intermediate language as the assembly code through final_start_function, final, and final_end_function interfaces.

The final_start_function interface is used for initializing a function status, for example, analyzing a quantity of instructions in a function in the intermediate language, and determining a quantity of insn statements. Details are not described.

The final interface is used for outputting the intermediate language as the assembly code. The method for rectifying a weak memory ordering problem (for example, the method for rectifying a weak memory ordering problem shown in FIG. 3 or FIG. 4b) provided in embodiments of this application may be performed in this phase. Specifically, the repair apparatus may perform the method described in S101 to S104 by using the final interface, and insert the memory barrier instruction before the target instruction. Then, the final interface invokes an output_asm_insn function to output the insn statement as the assembly code.

One insn statement includes a plurality of assembly instructions, and a length of each assembly instruction is usually 4. The quantity of insn statements and the quantity of instructions are determined when the function status is initialized. Therefore, the final interface usually determines a length of one insn statement.

However, when rectifying the read/write instruction by using the final interface, the repair apparatus inserts the memory barrier instruction before the target instruction. Therefore, the repair instruction changes the length of the insn statement. In this case, before the final interface outputs the assembly code, the final_start_function interface needs to perform corresponding processing on an original process of obtaining the length of the insn statement (for example, get_attr_length), to obtain the length of the insn statement after the memory barrier instruction is inserted. For example, function invocation reduces the quantity of instructions in the insn statement, to control a length of the insn statement. This is not limited herein.

Finally, final_end_function is used for cleaning up a resource for outputting the intermediate language as the assembly code.

The GCC then continues to assemble and link the repaired assembly code to output executable program code. Herein, in this embodiment of this application, a specific working process of the GCC is not described in detail. It should be understood that the executable program code finally output by the GCC is program code that repairs weak memory ordering.

In conclusion, embodiments of this application provide a method for rectifying a weak memory ordering problem. In the method, in a process of compiling source code of a multithreaded program, to-be-repaired instructions are classified, to determine a target instruction set. Then, a target instruction for which a memory barrier instruction needs to be inserted is further determined in the target instruction set by using an optimization policy, so that the target instruction can be executed in a sequence required by the program, to automatically rectify a weak memory ordering of the multithreaded program. According to the method provided in embodiments of this application, the weak memory ordering problem of the multithreaded program is repaired, so that efficiency of rectifying the weak memory ordering problem of the program is greatly improved.

In addition, in embodiments of this application, the weak memory ordering problem in to-be-repaired code may be identified and repaired by using a function as a unit. Therefore, the method provided in embodiments of this application can be applied to repairing a weak memory ordering problem of a large-scale multithreaded program, to improve practicability of the method in this application.

The foregoing mainly describes the solutions provided in embodiments of this application from the perspective of the method. To implement the foregoing functions, corresponding hardware structures and/or software modules for performing the functions are included. A person skilled in the art should be easily aware that, with reference to the units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the repair apparatus may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. In an actual implementation, another division manner may be used.

Figure 5:
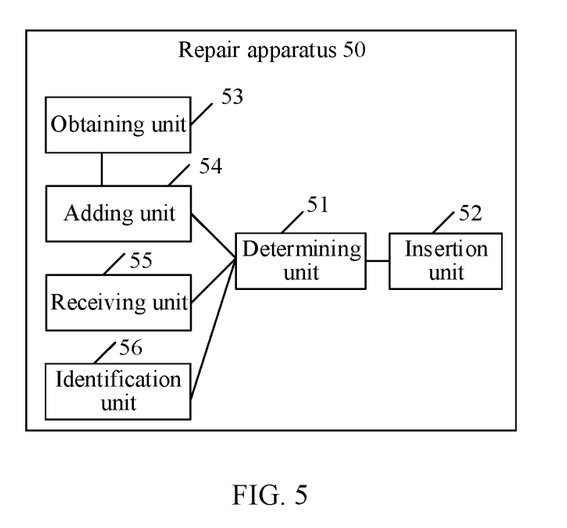
FIG. 5 is a schematic diagram of a structure of a repair apparatus according to an embodiment of this application.

FIG. 5 is a schematic diagram of a structure of a repair apparatus 50 according to an embodiment of this application. The repair apparatus 50 may be configured to perform the foregoing method for rectifying a weak memory ordering problem, for example, configured to perform the method shown in FIG. 3. The repair apparatus 50 may include a determining unit 51 and an insertion unit 52.

The determining unit 51 is configured to: determine a read/write instruction set in to-be-repaired code; and classify instructions in the read/write instruction set to determine a target instruction. The read/write instruction set includes a read instruction and/or a write instruction in the to-be-repaired code, and an instruction in the read/write instruction set is used for memory access. The insertion unit 52 is configured to insert a memory barrier instruction between a previous read/write instruction of the target instruction and the target instruction.

In an example, with reference to FIG. 3, the determining unit 51 may be configured to perform S101 to S103, and the insertion unit 52 may be configured to perform S104.

Optionally, the determining unit 51 is specifically configured to: determine a first-type instruction in the read/write instruction set; and determine the target instruction according to the first-type instruction. An instruction in the first-type instruction is an instruction with weak memory ordering security, and the target instruction is an instruction in the read/write instruction set other than the first-type instruction.

In an example, with reference to FIG. 3, the determining unit 51 may be configured to perform S102 and S103.

Optionally, the determining unit 51 is specifically configured to: determine a target instruction set according to the first-type instruction; and determine the target instruction in the target instruction set according to an optimization policy, where the target instruction set includes all instructions in the read/write instruction set except the first-type instruction; and the optimization policy indicates a type of a read/write instruction having a to-be-repaired weak memory ordering problem.

In an example, with reference to FIG. 3, the determining unit 51 may be configured to perform S103.

Optionally, the determining unit 51 is specifically configured to classify the instructions in the read/write instruction set according to an optimization policy, to determine the target instruction. The optimization policy indicates a type of a read/write instruction having a to-be-repaired weak memory ordering problem.

Optionally, the optimization policy includes at least one of the following policies: a first policy for determining a read/write instruction that is in the target instruction set and that belongs to a whitelist as the target instruction; or determining a read/write instruction that is in the target instruction set and that is other than a read/write instruction in a blacklist as the target instruction; a second policy for determining, as the target instruction, a read/write instruction serving only as a dependency in read/write instructions having a context dependency relationship in the target instruction set; a third policy for determining a read/write instruction in the target instruction set other than a read/write instruction related to a special-purpose register as the target instruction; and a fourth policy for determining a read/write instruction in the target instruction set other than a read/write instruction related to an input/output parameter as the target instruction.

Optionally, the repair apparatus 50 further includes an obtaining unit 53, configured to obtain a fifth policy configured by a user; and an adding unit 54, configured to add the fifth policy to the optimization policy.

Optionally, the repair apparatus 50 further includes a receiving unit 55, configured to receive indication information before the determining unit 51 determines the target instruction, where the indication information indicates a user to select the optimization policy from the to-be-selected optimization policies.

Optionally, the first-type instruction includes at least one of an instruction for reading/writing an inter-thread non-shared variable, or a read/write instruction with order-preserving semantics.

Optionally, the repair apparatus 50 further includes an identification unit 56, configured to identify an instruction in a target function, to determine the foregoing read/write instruction set. The target function is any function in the to-be-repaired code.

In an example, with reference to FIG. 3, the identification unit 56 may be configured to perform S101.

Optionally, the to-be-repaired code is an intermediate language obtained by compiling source code of a multi-threaded program by a compiler; or the to-be-repaired code is assembly code obtained by compiling source code of a multithreaded program by a compiler.

For specific descriptions of the foregoing optional manners, refer to the foregoing method embodiments. Details are not described herein again. In addition, for any explanation of the repair apparatus 50 provided above and descriptions of beneficial effects, refer to the foregoing corresponding method embodiments. Details are not described herein again.

In an example, with reference to FIG. 2, the determining unit 51, the insertion unit 52, the adding unit 54, and the identification unit 56 in the repair apparatus 50 may be implemented by the processor 21 in FIG. 2 by executing the program code in the memory 22 in FIG. 2. The obtaining unit 53 and the receiving unit 55 may be implemented by using the input/output interface 24 or the communication interface 23 in FIG. 2.

Figure 6:
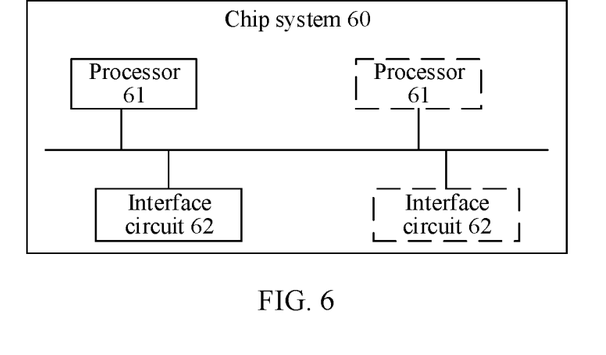
FIG. 6 is a schematic diagram of a structure of a chip system according to an embodiment of this application.

An embodiment of this application further provides a chip system 60. As shown in FIG. 6, the chip system 60 includes at least one processor and at least one interface circuit. In an example, when the chip system 60 includes one processor and one interface circuit, the processor may be a processor 61 shown in a solid line box (or a processor 61 shown in a dashed line box) in FIG. 6, and the interface circuit may be an interface circuit 62 shown in a solid line box (or an interface circuit 62 shown in a dashed line box) in FIG. 6. When the chip system 60 includes two processors and two interface circuits, the two processors include the processor 61 shown in the solid line box and the processor 61 shown in the dashed line box in FIG. 6, and the two interface circuits include the interface circuit 62 shown in the solid line box and the interface circuit 62 shown in the dashed line box in FIG. 6. This is not limited.

The processor 61 and the interface circuit 62 may be interconnected through a line. For example, the interface circuit 62 may be configured to receive a signal (for example, obtain an optimization policy). For another example, the interface circuit 62 may be configured to send a signal to another apparatus (for example, the processor 61). For example, the interface circuit 62 may read instructions stored in a memory, and send the instructions to the processor 61. When the instructions are executed by the processor 61, a repair apparatus is enabled to perform the steps in the foregoing embodiments. Certainly, the chip system 60 may further include another discrete device. This is not specifically limited in this embodiment of this application.

Another embodiment of this application further provides a computer-readable storage medium. The computer-readable storage medium stores instructions. When the instructions are run on a repair apparatus, the repair apparatus performs the steps performed by the repair apparatus in the procedure of the method shown in the foregoing method embodiments.

In some embodiments, the disclosed method may be implemented as computer program instructions encoded in a machine-readable format on a computer-readable storage medium or encoded on another non-transitory medium or product.

Figure 7:
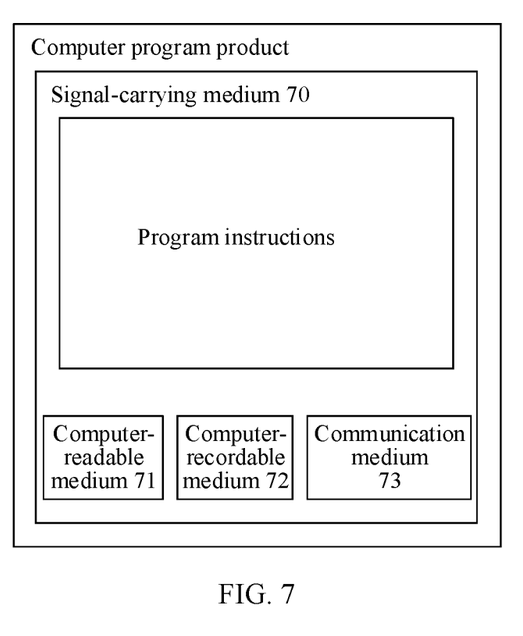
FIG. 7 is a schematic diagram of a structure of a computer program product according to an embodiment of this application.

FIG. 7 schematically shows a conceptual partial view of a computer program product according to an embodiment of this application. The computer program product includes a computer program for executing a computer process on a computing device.

In an embodiment, the computer program product is provided via a signal-carrying medium 70. The signal-carrying medium 70 may include one or more program instructions. When the one or more program instructions are run by one or more processors, the functions or a part of the functions described in FIG. 3 may be provided. Therefore, for example, one or more features described with reference to S101 to S104 in FIG. 3 may be borne by one or more instructions associated with the signal-carrying medium 70. In addition, the program instruction in FIG. 7 is also described as an example instruction.

In some examples, the signal-carrying medium 70 may include a computer-readable medium 71, for example, but not limited to, a hard disk drive, a compact disc (CD), a digital video disc (DVD), a digital tape, a memory, a read-only memory (ROM), or a random access memory (RAM).

In some implementations, the signal-carrying medium 70 may include a computer-recordable medium 72, for example, but not limited to, a memory, a read/write (R/W) CD, or an R/W DVD.

In some implementations, the signal-carrying medium 70 may include a communication medium 73, for example, but not limited to, a digital and/or analog communication medium (for example, an optical cable, a waveguide, a wired communication link, or a wireless communication link).

The signal-carrying medium 70 may be conveyed by the communication medium 73 in a wireless form (for example, a wireless communication medium that complies with the IEEE 1902.11 standard or another transport protocol). The one or more program instructions may be, for example, one or more computer-executable instructions or one or more logic implementation instructions.

In some examples, the repair apparatus described in FIG. 3 may be configured to provide various operations, functions, or actions in response to one or more program instructions in the computer-readable medium 71, the computer-recordable medium 72, and/or the communication medium 73.

It should be understood that the arrangement described herein is merely used as an example. Therefore, a person skilled in the art appreciates that another arrangement and another element (for example, a machine, an interface, a function, a sequence, and an array of functions) can be used for replacing the arrangement, and some elements may be omitted together depending on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used for implementing embodiments, all or some of the embodiments may be implemented in a form of a computer program product. The computer program product includes one or more computer instructions. When the computer-executable instructions are executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, wherein the method comprises:
   determining a read/write instruction set in to-be-repaired code, wherein the read/write instruction set comprises a read instruction or a write instruction in the to-be-repaired code, and wherein an instruction in the read/write instruction set is used for memory access;
   classifying instructions in the read/write instruction set to determine a target instruction; and
   inserting a memory barrier instruction between a previous read/write instruction of the target instruction and the target instruction.

2. The method according to claim 1, wherein the classifying instructions in the read/write instruction set to determine a target instruction specifically comprises:
   determining a first-type instruction in the read/write instruction set, wherein the first-type instruction is an instruction with weak memory ordering security; and
   determining the target instruction according to the first-type instruction, wherein the target instruction is an instruction in the read/write instruction set other than the first-type instruction.

3. The method according to claim 2, wherein the determining the target instruction according to the first-type instruction specifically comprises:
   determining a target instruction set according to the first-type instruction, wherein the target instruction set comprises all instructions in the read/write instruction set except the first-type instruction; and
   determining the target instruction in the target instruction set according to an optimization policy, wherein the optimization policy indicates a type of a read/write instruction having a to-be-repaired weak memory ordering problem.

4. The method according to claim 1, wherein the classifying instructions in the read/write instruction set to determine a target instruction specifically comprises:
   classifying the instructions in the read/write instruction set according to an optimization policy to determine the target instruction, wherein the optimization policy indicates a type of a read/write instruction having a to-be-repaired weak memory ordering problem.

5. The method according to claim 4, wherein the optimization policy comprises at least one of:
   a first policy for determining a read/write instruction that is in the target instruction set and that belongs to a whitelist as the target instruction; or determining a read/write instruction that is in the target instruction set and that is other than a read/write instruction in a blacklist as the target instruction;
   a second policy for determining, as the target instruction, a read/write instruction serving only as a dependency in read/write instructions having a context dependency relationship in the target instruction set;
   a third policy for determining a read/write instruction in the target instruction set other than a read/write instruction related to a special-purpose register as the target instruction; or
   a fourth policy for determining a read/write instruction in the target instruction set other than a read/write instruction related to an input/output parameter as the target instruction.

6. The method according to claim 5, wherein the method further comprises:
   obtaining a fifth policy configured by a user; and
   adding the fifth policy to the optimization policy.

7. The method according to claim 4, wherein before the determining the target instruction, the method further comprises:
   receiving indication information, wherein the indication information indicates a user to select the optimization policy from to-be-selected optimization policies.

8. The method according to claim 2, wherein the first-type instruction comprises at least one of an instruction for reading/writing an inter-thread non-shared variable, or a read/write instruction with order-preserving semantics.

9. The method according to claim 1, wherein the determining a read/write instruction set specifically comprises:
   identifying an instruction in a target function to determine the read/write instruction set, wherein the target function is any function in the to-be-repaired code.

10. The method according to claim 1, wherein:
    the to-be-repaired code is in an intermediate language obtained by compiling source code of a multithreaded program by a compiler; or
    the to-be-repaired code is assembly code obtained by compiling source code of a multithreaded program by a compiler.

11. An apparatus, wherein the apparatus comprises one or more memories and one or more processors, and the one or more memories store computer instructions for execution by the one or more processors to:
    determine a read/write instruction set in to-be-repaired code, wherein the read/write instruction set comprises a read instruction or a write instruction in the to-be-repaired code, and wherein an instruction in the read/write instruction set is used for memory access;

classify instructions in the read/write instruction set to determine a target instruction; and insert a memory barrier instruction between a previous read/write instruction of the target instruction and the target instruction.

12. The apparatus of claim 11, wherein the computer instructions are for execution by the one or more processors to:

determine a first-type instruction in the read/write instruction set, wherein the first-type instruction is an instruction with weak memory ordering security; and determine the target instruction according to the first-type instruction, wherein the target instruction is an instruction in the read/write instruction set other than the first-type instruction.

13. The apparatus of claim 12, wherein the computer instructions are for execution by the one or more processors to:

determine a target instruction set according to the first-type instruction, wherein the target instruction set comprises all instructions in the read/write instruction set except the first-type instruction; and determine the target instruction in the target instruction set according to an optimization policy, wherein the optimization policy indicates a type of a read/write instruction having a to-be-repaired weak memory ordering problem.

14. The apparatus of claim 11, wherein the computer instructions are for execution by the one or more processors to:

classify the instructions in the read/write instruction set according to an optimization policy to determine the target instruction, wherein the optimization policy indicates a type of a read/write instruction having a to-be-repaired weak memory ordering problem.

15. The apparatus of claim 14, wherein the optimization policy comprises at least one of:

a first policy for determining a read/write instruction that is in the target instruction set and that belongs to a whitelist as the target instruction; or determining a read/write instruction that is in the target instruction set and that is other than a read/write instruction in a blacklist as the target instruction;

a second policy for determining, as the target instruction, a read/write instruction serving only as a dependency in read/write instructions having a context dependency relationship in the target instruction set;

a third policy for determining a read/write instruction in the target instruction set other than a read/write instruction related to a special-purpose register as the target instruction; or a fourth policy for determining a read/write instruction in the target instruction set other than a read/write instruction related to an input/output parameter as the target instruction.

16. The apparatus of claim 15, wherein the computer instructions are for execution by the one or more processors to:

obtain a fifth policy configured by a user; and add the fifth policy to the optimization policy.

17. The apparatus of claim 14, wherein the computer instructions are for execution by the one or more processors to:

receive indication information, wherein the indication information indicates a user to select the optimization policy from to-be-selected optimization policies.

18. The apparatus of claim 12, wherein the first-type instruction comprises at least one of an instruction for reading/writing an inter-thread non-shared variable, or a read/write instruction with order-preserving semantics.

19. The apparatus of claim 12, wherein the computer instructions are for execution by the one or more processors to:

identify an instruction in a target function to determine the read/write instruction set, wherein the target function is any function in the to-be-repaired code.

20. A non-transitory computer-readable storage medium, wherein the non-transitory computer-readable storage medium stores a computer program; and when the computer program is run on a computer, the computer is enabled to perform:

determining a read/write instruction set in to-be-repaired code, wherein the read/write instruction set comprises a read instruction or a write instruction in the to-be-repaired code, and wherein an instruction in the read/write instruction set is used for memory access;

classifying instructions in the read/write instruction set to determine a target instruction; and inserting a memory barrier instruction between a previous read/write instruction of the target instruction and the target instruction.

* * * * *